United States Patent [19]
Channell

[11] 3,710,003
[45] Jan. 9, 1973

[54] CONNECTING BLOCK AND HOUSING FOR USE IN UNDERGROUND RESIDENTIAL POWER DISTRIBUTION

[76] Inventor: William H. Channell, 122 Oak Tree Drive, Glendora, Calif. 91740

[22] Filed: April 16, 1971

[21] Appl. No.: 134,759

[52] U.S. Cl. ..................174/37, 174/51, 174/60, 174/72 R, 174/77 R, 339/116 C, 339/242, 339/273 R
[51] Int. Cl. ..........................H02g 9/02, H01r 7/06
[58] Field of Search......174/37, 38, 44, 51, 60, 71 R, 174/72 R, 77 R, 87, 81; 339/116 R, 116 C, 242, 270 R, 273 R, 273 F

[56] References Cited

UNITED STATES PATENTS

| | | | |
|---|---|---|---|
| 3,449,507 | 6/1969 | Channell | 174/77 R |
| 2,087,384 | 7/1937 | Lee | 174/87 X |
| 2,184,574 | 12/1939 | Addie | 174/60 |
| 3,395,382 | 7/1968 | Weagant | 339/116 C |
| 3,435,124 | 3/1969 | Channell | 174/38 |
| 3,444,505 | 5/1969 | Becker | 174/72 R UX |
| 3,519,981 | 7/1970 | Koletsos et al. | 339/242 |
| 3,609,646 | 9/1971 | Becker et al. | 174/72 R X |

FOREIGN PATENTS OR APPLICATIONS

| | | | |
|---|---|---|---|
| 850,906 | 9/1952 | Germany | 174/81 |

*Primary Examiner*—Laramie E. Askin
*Attorney*—J. Calvin Brown

[57] ABSTRACT

The device comprises a collector ring or connector block provided with a series of uniform diameter transverse bores or holes. These holes are for passage therein of bare cable. A collet is provided for each hole, the external diameter of the collet fitting within a hole of the collector ring and the center bore of the collet receiving a bare cable. The collets are thrust within the holes of the collector ring under hydraulic pressure whereby each collet engages the bare cable over 360° and, likewise, the same number of degrees in the collector ring. This results in a connection which is not subject to hot spots and provides what is termed a cold joint. The current carrying capacity of the collector ring must be equal to or greater than the current carrying capacity of cables at the point of attachment. A housing is provided for the collector ring comprising a sealing adapter and a cap or dome. In addition there is a neoprene sealing grommet having holes through which the insulated cable is passed. The sealing adapter and the dome or cap are screw threaded together sealing on the outer top edge of the sealing grommet.

4 Claims, 6 Drawing Figures

PATENTED JAN 9 1973

3,710,003

INVENTOR,
WILLIAM H. CHANNELL;
BY
Calvin Brown
ATTORNEY

CONNECTING BLOCK AND HOUSING FOR USE IN UNDERGROUND RESIDENTIAL POWER DISTRIBUTION

BACKGROUND OF THE INVENTION

DESCRIPTION OF THE PRIOR ART

The prior art in this field uses set screws for the connector and it is well known that such screws must be retightened to maintain a satisfactory connection, because of the cable taking a set, having cold flow of metal, etc. Further, the set screw type of connector does not employ a 360° contact with the cable nor with the connector. Furthermore the set screw type of connector requires a further container or pedestal for protection against the elements and to render the same water tight.

SUMMARY

The invention is useful for underground residential distribution of electricity and is so designed as to allow complete burial thereof without requiring a further container to house the same for protection against the elements and to render the same water tight. As a rule, three collector rings or connecting blocks with housings are required in each installation and the housings are supplied color coded so as to identify the legs of the circuit. Each group of connector blocks or collector rings will connect four houses or three houses and one street light, by way of example. It is imperative in a device of this character that electric power is distributed without loss and this is accomplished by providing a collector ring or connector block having large diameter tapered bores or holes to confine collets having a common tapered outside diameter and internal bores to accommodate all cable sizes. Internal bores of the collets accommodate the diameter of the buried cables and the collets receive the buried cable therethrough followed by pressing the collets under pressure within the bores of the collector rings or connecting blocks whereby the collets engage the bare cable over 360° and, likewise, engage the bores of the collector rings or connector block over the same degree. Electric current is distributed between the cables by the collector ring or block so that heat is not generated due to electric resistance with the resulting hot connection.

DESCRIPTION OF THE PREFERRED EMBODIMENT

Figure 1:
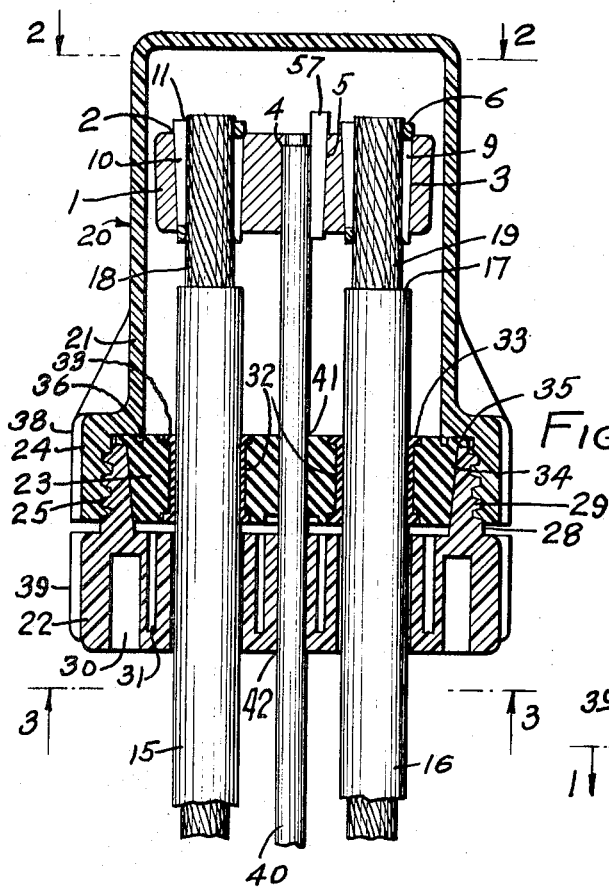
FIG. 1 is a vertical sectional view on the line 1—1 of FIG. 3.
Figure 2:
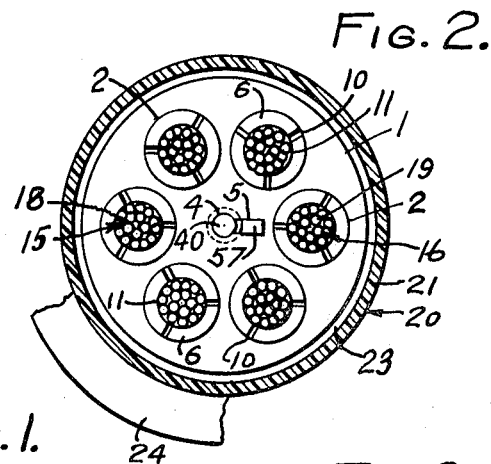
FIG. 2 is a transverse sectional view on the line 2—2 of FIG. 1.
Figure 3:
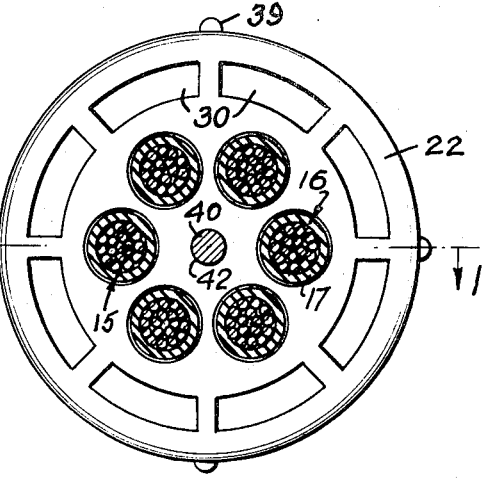
FIG. 3 is a sectional view on the line 3—3 of FIG. 1.
Figure 4:
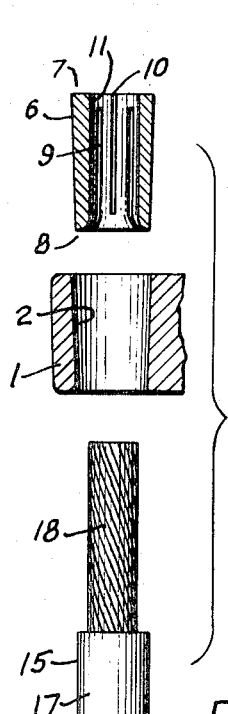
FIG. 4 is a separated view of elements used in the invention.
Figure 5:
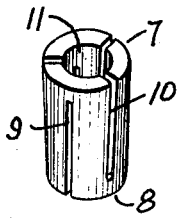
FIG. 5 is a perspective view of a collet of the type used in the invention.

The device of the invention includes a connector block or collector ring 1 hereinafter designated as "-block" preferably formed from a metal such as aluminum and of circular form, and of fairly thick dimension or depth. The block is provided with a series of spaced apart transverse bores 2 which are tapered downwardly as indicated at 3. The block is provided with a shouldered central or axial bore at 4, and provided with a groove 5 communicating with the bore 4. The bores 2 are adapted to receive collets 6 of the type shown in FIGS. 4 and 5. These collets are of the usual form and are alternately split from each end 7 and 8 as shown at 9 and 10. The outer surface of each collet is tapered and the central bore 11 is of a size which corresponds to the size of a bare cable to be positioned in said bore. Feeder cables such as shown at 15 and 16 have insulation 17 removed from the ends of said cables to expose the bare strands of the cables as shown at 18 and 19. As a rule, the insulation 17 is removed for approximately two to three inches from the cable ends. The bare cables are passed through the holes or bores 2 and secured to the collector block by the collets 6. The cables are passed through the small ends of the collets and the tapered outer surfaces of the collets engage the tapered surface of the bores 2. After the cables are passed through the collets, the collets are pressed downwardly within the holes of the connector block, hydraulic means or the equivalent is utilized for pressing the collets under pressure so that each collet completely contacts the cable over 360° and, likewise, contacts the bores 2 of the block the same number of degrees. As the device as an entirety is to be placed underground, it is essential that the connector block and bare cable ends be protected from the elements and at the same time be water tight for safe operation. To accomplish this a housing is provided, as shown at 20, and consists of a receptacle-like cap or dome 21, a sealing adapter 22, and a neoprene or rubber grommet 23. The cap or dome is closed at one end and open at the opposite end, the open end being provided with an enlarged circular offset skirt 24, the internal surface of the skirt being provided with screw threads 25. The adapter 22 is provided on its upper surface with an integrally formed taper sided annular skirt 28, the inner surface of which is tapered and provided with external screw threads 29 which threads are adapted to mate with the threads 25 of the skirt 24. The adapter is cored inwardly from the bottom surface as shown in FIGS. 1 and 3, at 30, and provided with holes 31 extending downwardly from the top surface to reduce the weight of the adapter.

The grommet 23 is provided with bores 32 to permit passage therethrough of the cable and its insulation and the number of bores corresponds to the number of bores in the connector block. Each bore 32 may receive a spool-type bushing 33 which encompasses a cable. The grommet 23 has a tapered circular wall 34 and a flange portion which extends beyond the tapered wall, as shown at 35. Skirt 24 is internally provided with an annular bead 36 which bears against the top surface of the grommet. When the cap or dome is rotated to couple the cap and adapter together, the tapered inner surface of skirt 28 engages the tapered wall of the grommet and forces the grommet into tight engagement with the cable sheaths and the bead 36 indents the top surface of the grommet so that the interior of the cap or dome is water tight. The external surface of the skirt 24 is provided with transverse wrench lugs 38 as is, likewise, the adapter at 39 so that the parts may be held and the cap rotated relative to the adapter by hand or by a spanner wrench.

If a ground connection for the connector block is required, a rod 40 is received in the shouldered bore 4 of the block 1 and the rod extends through central bores of both the grommet and adapter as shown at 41 and 42. The ground rod 40 is held in position and secured to the connector block by a wedge 57 driven against the ground rod when the wedge is received in the slot 5. Initially, the holes of the neoprene grommet receive plastic plugs to close entrance to said holes. The plastic plugs are removed for the cable and depending upon the diameter of the cable, spool type bushings are provided so that the grommet plus the bushings tightly encircle the cable. If the cable is of a size equal to the diameters of the holes of the grommet, no bushing is required.

Figure 6:
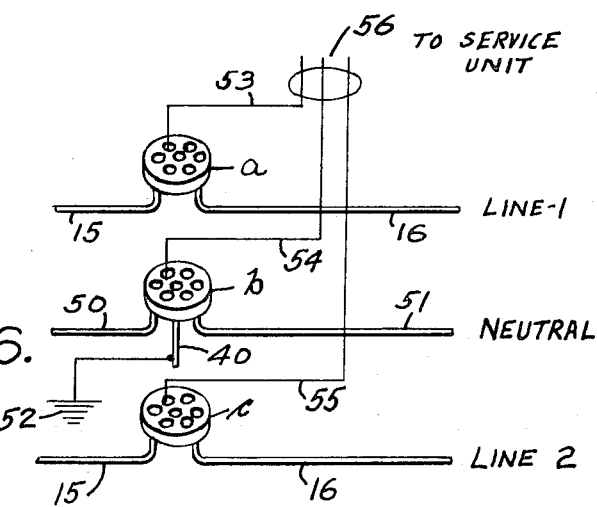
FIG. 6 is a wiring diagram for devices of the invention.

In operation, reference is made to FIG. 6 wherein is shown three connecting blocks and housings, the connecting blocks being designated as *a*, *b*, and *c*. Power cable of line 1 would correspond to cable 15 and the secondary line 2 would correspond to cable 16 which connects with the connector block as shown in FIG. 1. Neutral lines 50 and 51 would be grounded by rod 40 at 52 while line 2 would connect with connector block *c*, and correspond to cables 15 and 16. Thus the connector blocks *a*, *b*, and *c* would have cable leads with said connector blocks at 53, 54 and 55 to a service unit, as indicated at 56. Thus, each group of three connector blocks will connect four houses or three houses and one street light, it being observed that there are six holes in each connector block. The number of holes in a connector block may vary and the provision of six holes is by way of illustration only of the use of the present device. Also, the cables may vary as to size. In each instance the collets which have like external diameters for reception within the holes of the block may vary as to the center hole diameter to fit the cable.

Three connecting blocks with housings are required at each installation and the housings are supplied color coded so as to identify the legs of the circuit.

I claim:
1. A connector assembly for terminating cable ends including:
   a. a cap having a shoulder and an annular skirt projecting from said shoulder,
   b. a sealing adapter having an annular skirt threadably contained within said cap skirt,
   c. said sealing adapter skirt having a tapered inner surface, and
   d. a resilient grommet having a tapered portion disposed within said sealing adapter skirt and compressed thereby,
   e. said grommet being provided with an annular flange at its widest point disposed between said cap shoulder and sealing adapter skirt,
   f. said sealing adapter and grommet being provided with cable-receiving openings,
   g. said sealing adapter openings being aligned with said grommet openings.
2. A connector assembly as in claim 1 including:
   a. a conductor passing through said sealing adapter and grommet into said cap and supported by said grommet,
   b. a connector block disposed within said cap and supported by said conductor, said connector block being provided with a plurality of tapered openings, and
   c. a plurality of resilient collets disposed within said connector block openings,
   d. said collets having tapered outer surfaces and central cable-receiving holes,
   e. said conductor being retained within one of said collets.
3. A connector assembly as in claim 2 and including:
   a. a conductive ground rod centrally passing through said sealing adapter and said grommet, said ground rod being secured to said connector block.
4. A connector assembly as in claim 1 and including:
   a. a bead on said cap shoulder bearing against said grommet.

* * * * *